Sept. 10, 1929.  R. C. WASHBURN  1,727,530
ICELESS JACKET
Filed Oct. 3, 1927
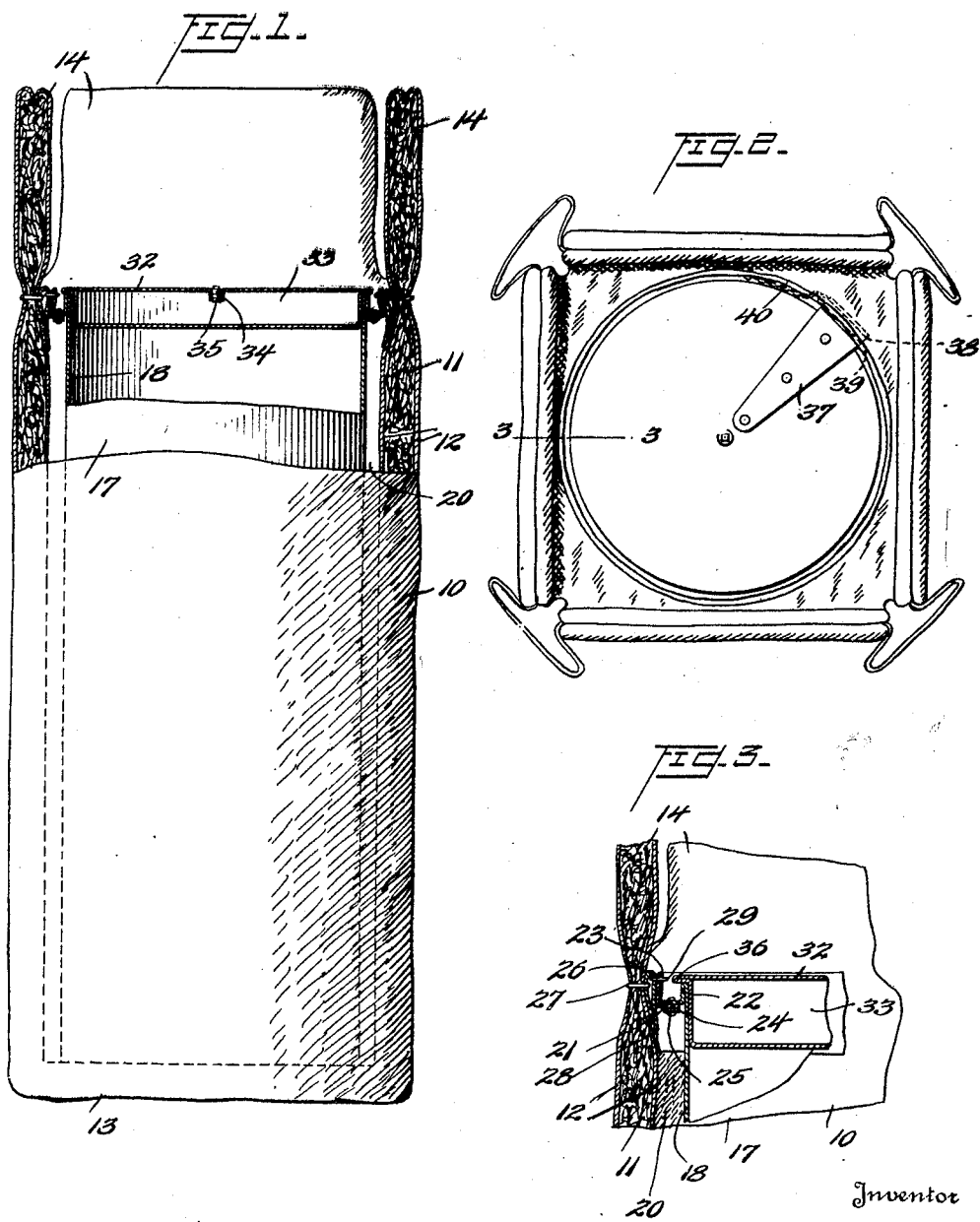

Patented Sept. 10, 1929.

1,727,530

UNITED STATES PATENT OFFICE.

RICHARD C. WASHBURN, OF SAUGERTIES, NEW YORK.

ICELESS JACKET.

Application filed October 3, 1927. Serial No. 223,754.

This invention relates to iceless jackets or casings for receptacles adapted for containing food and more particularly is directed to an insulating jacket adapted to receive a can of ice cream and to maintain the same in a frozen condition over a considerable period of time without the use of ice.

It is a general object of the present invention to provide a novel and improved form of iceless jacket for ice cream cans and the like.

More particularly it is an object of the present invention to provide an insulating jacket for ice cream cans having an inner self-supporting water-proof lining adapted to maintain the jacket in a distended form so that the ice cream can may readily be inserted therein.

A feature of the invention comprises a novel means of securing the upper edge of the inner metal lining to the upper edge of the outer insulating covering of the ice cream can jacket, whereby water is kept out of the space between the lining and the jacket.

A further feature of the invention resides in the arrangement of a cover for the inner lining of an ice cream can jacket, which cover is adapted to receive a super-cooled fluid for the purpose of maintaining the ice cream in the top of a can, which is placed in the jacket, in a solid condition in spite of any extra radiation which may result, due to an insecurely closed top on the jacket.

Other and further features of the invention are disclosed in the accompanying drawing and the following specification, as will be evident to those skilled in the art. It will be understood that various changes may be made in the invention as disclosed without departing from the spirit thereof.

In said drawing

Fig. 1 is a side elevation, partially in central vertical section to show the inner construction of the jacket;

Fig. 2 is a plan view of the jacket shown in Fig. 1; and

Fig. 3 is a transverse vertical section on line 3—3 of Fig. 2, showing, on an enlarged scale, the manner of securing the outer covering to the inner lining.

In my Patent, No. 1,639,418, dated August 16, 1927, I have disclosed an insulating casing for ice cream cans, the same being formed of a suitable, flexible, heat-insulating material covered on the inner and outer surfaces with a water-proof material such as canvas, the whole being formed as a bag or sack adapted to receive and closely engage the sides of an ice cream can, suitable flaps being provided to fold over the top of the can to complete the enclosure. Such a jacket is more or less flexible and pliable, and while it could be collapsed into a small space for shipping, nevertheless offered certain difficulties when it came to placing the can of ice cream within the jacket, owing to its lack of rigidity and its tendency to collapse. The operation of placing a can within a jacket consumes considerable time on the part of workmen performing the operation. To overcome this difficulty as well as others, the present invention has been devised.

Referring to the drawings, it will be seen that the jacket proper is substantially identical with that described in the above mentioned patent and includes the tubular body portion 10 formed of an inner layer of insulating material 11 such as felt or the like, covered on the inner and outer surfaces with water-proof canvas 12. The bottom 13 closes one end of the tubular portion, but the upper end is normally open and is provided with the flaps 14 conveniently formed as integral extensions of the body portion 10 and adapted to be folded down, and overlapped, over the top of an ice cream can which may be arranged in the jacket. The bottom and flaps are preferably constructed of the same insulating material as the side walls of the jacket.

To render the jacket rigid and self-supporting so that it will readily receive an ice cream can, it is provided with an inner lining 17 of suitable rigid material. Conveniently, this lining may constitute a can formed of galvanized or tinned iron or the like comprising the tubular side walls 18 and a suitable bottom closure. This can has a loose fit within the jacket which is of somewhat larger diameter in order that it may assume a substantially square configuration at the top for convenience in folding over the flaps, as will be apparent from Fig. 2.

Since the interior of the can must be washed occasionally and since it is exposed to moisture from condensation and various other causes, it is desirable that a watertight connection be made between the upper edge of the insulating jacket and the upper edge of the can to prevent the entrance of water into the space 20 between these two, which would tend to rot the insulating material. This is accomplished by providing a circumferential flange 21 near the upper edge of the can. Conveniently, this may be formed as shown in Fig. 3 by bending the can edge downwardly as at 22 and then outwardly to form the flange a slight distance below the upper edge of the can. A suitable piece of water-proof fabric 23, such as canvas or the like, is perforated so that it can be slipped over the can from the bottom and will abut against the under side of the flange. A metal ring or the like 24 is then placed over the can and secured against the canvas 23 by riveting the flange 21, canvas 23, and the ring 24 together by rivets such as shown at 25, thus forming a water-tight joint in a very simple manner.

In order to fasten the outer edges of the canvas sheet 23 to the walls of the otherwise completed jacket, a strip of water-proof material such as canvas 26 is sewed around to the upper edge of the jacket by means of the stitches 27 substantially along the center of the strip. The stitches 27 also assist in compressing the insulating material to form a convenient folding line for the flaps. The upper portion of this strip of canvas 26 is folded down upon itself, so that the upper portion 28 thereof lies against the lower portion. The outer edges of the canvas sheet 23 are folded under, and the fold is secured to the fold of the canvas strip 26, adjacent its stitching to the body portion of the jacket, by suitable stitches 29 which may be whipped over by hand or otherwise suitably placed in position. The stitching material, as well as the canvas, being impregnated with a suitable water-proofing compound, the various seams just described are water-resistant. It will be seen that the canvas sheet 23 thus forms a barrier against the entrance of water between the insulating covering and the rigid water-proof inner lining. The construction is such that the lining can readily be applied to a standard jacket of the type described in the applicant's prior patent.

It is sometimes found that after a long interval the ice cream in a can enclosed in the jacket begins to soften at the top since there is some tendency toward air and heat leakage where the flaps of the jacket overlap. In the present instance, a means of overcoming this difficulty to a large extent has been illustrated. It comprises a hollow lid 32 for the lining 17. This lid is of substantial depth and forms the chamber 33 which is adapted to receive a super-cooled liquid such as brine to assist in maintaining the proper temperature of the ice cream in the can. The liquid may be placed in and removed from the hollow lid through the opening 34 closed by the pipe-threaded plug 35. The lid fits within the upper end of the lining as clearly shown in Fig. 1, and the radial flange 36 prevents the same from falling within the lining. It may sometimes be found advantageous to hinge this lid to the lining, in which case a hinge strap, such as 37, is riveted to the top of the lid and cooperates with a hinge section 38 secured to the flange 21 on the lining. If desired, the removable hinge pin 39 may be provided and attached to the lining by means of a chain 40. In this manner, the lids can be readily removed for filling and emptying.

It will be found that the iceless jackets provided with the lining just described can be loaded with cans much more rapidly and can likewise be emptied more quickly. Furthermore, the interior, being washable, is much more sanitary than the usual fabric interior of the jackets. The metal lining offers a suitable protection to the lining against wear resulting from constantly inserting and removing cans which are usually wet and may be somewhat gritty on the outer surface.

Having thus described the invention, what is claimed as new and desired to be secured by Letters Patent is:

1. In a jacket for ice cream cans, in combination, a self-supporting, open ended, watertight inner lining, a flexible, heat insulating covering in the form of an open ended bag surrounding said lining and means securing the edge of said lining to the upper edge of said covering and preventing the entrance of water between said parts.

2. In a jacket for ice cream cans, in combination, a tubular body portion closed at the bottom and formed of heat insulating material, insulating means adapted to close over the top of a can in said body portion, a watertight metal lining in said body portion extending the full length thereof and means attaching the lining to the body portion.

3. In a jacket for ice cream cans, in combination, a tubular body portion closed at the bottom and formed of heat insulating material, insulating means adapted to close over the top of a can in said body portion and a watertight metal lining in said body portion, said lining having its upper edge connected to the upper edge of the body portion of said jacket in a watertight manner.

4. In a jacket for ice cream cans, in combination, a tubular body portion closed at the bottom and formed of flexible, heat-insulating material, insulating means secured to the upper edge of said body portion and adapted to be closed over the top of an ice cream can in said jacket, a water-proof metal lining inside of said body portion, a sheet of flexible water-proof material having an opening therein, the edges of which are secured near the upper edge of said lining, and means securing the outer edges of said sheet to said body portion.

5. In a jacket for an ice cream can, in combination, a bag-like envelope of flexible heat insulating material open at the top, a watertight metal lining fitted in said envelope, a flange near the upper open end of said lining, a flexible waterproof sheet perforated to fit over said lining and abutting said flange, a ring against said sheet and secured to said flange to attach said sheet to said lining in a water-tight manner, the outer edges of said sheet being stitched to the edges of the opening of said envelope, whereby said sheet prevents the entrance of liquids between the envelope and lining.

6. In a jacket for an ice cream can, in combination, a bag-like envelope of flexible heat insulating material open at the top, a watertight metal lining fitted in said envelope to prevent the ice cream can from contacting therewith, a flange near the upper open end of said lining, a flexible water-proof sheet perforated to fit over said lining and abutting said flange, a ring against said sheet and secured to said flange to attach said sheet to said lining in a water-tight manner, the outer edges of said sheet being stitched to the edges of the opening of said envelope, whereby said sheet prevents the entrance of liquids between the envelope and lining, a closure means of fabric for said envelope and a metal lid for said lining adapted to prevent contact between said ice cream can and said fabric closure means.

7. In a jacket for an ice cream can, in combination, a bag-like envelope of flexible heat insulating material open at the top, a watertight metal lining loosely fitted in said envelope, a flange near the upper open end of said lining, a flexible water-proof sheet perforated to fit over said lining and abutting said flange, a ring against said sheet and secured to said flange to attach said sheet to said lining in a water-tight manner, a strip of water-proof fabric secured around the inner surface of said enevlope near the open end thereof by a row of stitching between its edges, the upper edge of said strip being folded down and the edges of said sheet being secured to said fold.

In testimony whereof I hereunto affix my signature.

RICHARD C. WASHBURN.